Jan. 31, 1961 E. M. POE 2,969,572
SAFETY CLAMP
Filed July 7, 1958
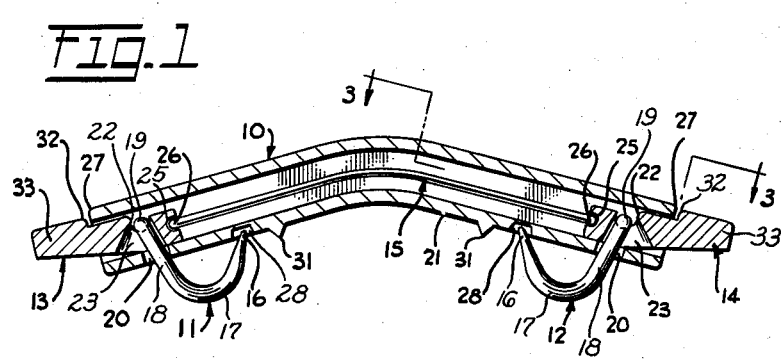
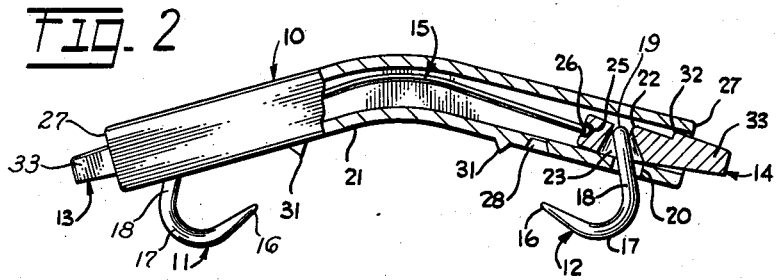
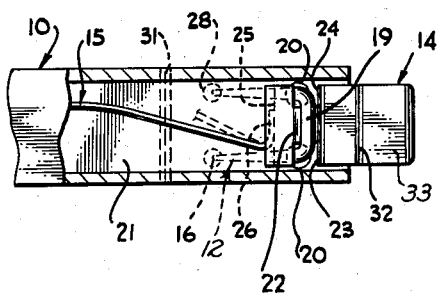
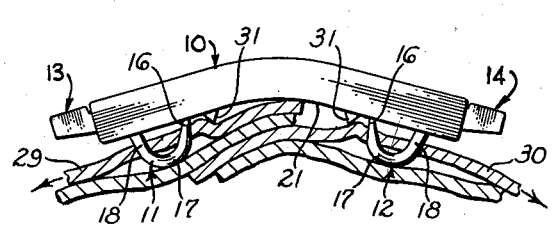
ELOISE M. POE
*INVENTOR.*
BY HER ATTORNEYS
HARRIS, KIECH, FOSTER & HARRIS

United States Patent Office 2,969,572
Patented Jan. 31, 1961

2,969,572

SAFETY CLAMP

Eloise M. Poe, 9204 Whitworth Drive, Los Angeles, Calif.

Filed July 7, 1958, Ser. No. 746,822

5 Claims. (Cl. 24—87)

This invention relates to a clamp or hooking device for fastening sections of fabrics to each other, such as sections of overlapping cloth pulled toward each other, and especially to a hooking, pinning or clamping device for fastening diapers on a baby.

Conventional, so-called safety pins, have many disadvantages when used, for example, to pin diapers on a baby. They cannot conveniently be manipulated with one hand. There is danger that the baby or the manipulator will be stuck by the pin point. It is relatively easy for the manipulator to mistakenly believe that the pin has been safely closed when such is not the case. The incompletely closed pin later often snaps open and sticks the baby.

Safety pins and other types of pins and fasteners have similar disadvantages when applied to situations other than pinning diapers; that is, they require two hands for manipulation thereof and many of them cause irritation or harm to the manipulator or wearer. Some types of pins and fasteners become stuck and are difficult to open and some open accidentally and cause injury to the wearer.

Accordingly, it is an important object of my invention to provide a clamp or hooking device which is free of all of the above-described disadvantages and defects.

Another object of my invention is to provide such a device which rapidly and conveniently can be both applied and removed with only one hand.

A further object of my invention is to provide a safety clamp which is safe and positive in action and use in applying and changing baby's diapers, and can be manipulated rapidly, safely and efficiently with one hand.

Additional objects will become apparent from the following description which is given primarily for purposes of illustration and not limitation.

Stated in general terms, the objects of my invention are attained by providing a clamp comprising a housing member which preferably is somewhat elongated and somewhat bowed to facilitate the manipulation of the clamp between the thumb and fingers of the same hand and to assist in hooking the clamp in the fabric. Spaced-apart clamp, hook or pin members are pivotally mounted on the housing member to pivot to a closed position to clamp, hook or pin fabric or other material, such as folds of a diaper, for example, and to pivot to an open position to release the fabric or other material. The use of a double-pronged hook member near each end of the housing actuated by a member such as a button slidably mounted in each end of the housing has been found to give very satisfactory results with diapers. A loaded resilient member, such as a spring, also is mounted in the housing to maintain the clamp or hook members in the closed position when they are not urged manually into the open position.

A more detailed description of a specific embodiment of my invention is given with reference to the accompanying drawing, wherein:

Fig. 1 is a longitudinal sectional view drawn to an enlarged scale showing the hooks of the safety clamp in the closed position;

Fig. 2 is a similar view partially in section showing the hooks urged into the open position;

Fig. 3 is a partial sectional plan view taken along the line 3—3 of Fig. 1 showing the construction and mounting of the hooks and actuator buttons; and Fig. 4 is a side elevational view showing a clamp applied to overlapping edges of fabric.

The body or housing 10 is made of rectangular cross-section but other shapes can be used to suit the situation to which the clamp is applied. The housing also is shown to have an elongate shape, i.e., greater length than width. Here again the proportions can be varied to suit the environment in which the clamp is to be used so that a square, circular, oval, elliptical or other suitably shaped housing can be used. The housing can be made of any suitable material such as plastics, metals, etc. Preferably, the housing is molded of a suitable plastic in two parts which are bonded together after the hooks 11 and 12, buttons 13 and 14 and spring 15 have been mounted therein. As mentioned hereinabove, the housing 10 is bowed longitudinally around a transverse middle axis to assist in hooking the clamp into the cloth to be clamped and to facilitate the manipulation thereof with one hand. The amount of bowing or angularity of the housing is made to be in the range of about 5° to 25° and preferably about 15° from linearity around the transverse middle axis, approximately as shown in the drawing.

The hooks 11 and 12 are shown in the drawing as being bifurcated to provide balanced lateral distribution of the holding load on the hooks produced by the tension loading in the cloth hooked thereby, as best shown in Fig. 4. It will be understood, however, that single-pronged hooks, or hooks with three or more prongs can be used for various applications of my safety clamp. Each of the prongs of the hooks is provided with a fairly sharp point 16, a hooked portion 17, and a shank 18. A yoke 19 joins the tops of the shanks of the two prongs. The hooks can be made of any suitable material such as stainless steel, cadmium plated music wire, brass, etc. or other materials such as suitable plastics.

Each of the hooks 11 and 12 is mounted near one end of the housing 10 with the prongs of the hooks projecting through apertures 20 formed through the inner or under side 21 of the housing. The apertures 20 are made somewhat larger in diameter than the shank portions 18 of the hooks so that the hooks can pivot freely between the closed position shown in Fig. 1 and the open position shown in Fig. 2. Each of the hooks also is mounted over a button 13 or 14 with a yoke 19 rotatably positioned in a transverse groove 22 formed across the button 13 or 14. The buttons are notched at 23 and 24 to permit the shanks 18 of the hooks 11 and 12 to pivot freely. The buttons 13 and 14, which can be made of plastics, metal, glass, ceramics or any other suitable material, are slidably mounted in the ends of the housing 10 and serve as actuators of the hooks.

Each of the buttons is provided with a transverse groove 25 across the inner end thereof to receive a hooked end 26 of the music wire spring 15. The spring 15 is loaded to continually urge the buttons 13 and 14 outwardly of the ends of housing 10. The outward movement of the buttons is limited by the positions assumed by the hooks 11 and 12 in the closed position. The points 16 of the hooks tightly engage in recesses 28 formed in the under side 21 of the housing 10 to receive the points when the hooks are urged into the closed position as shown in Fig. 1. The spring 15 is made strong enough so that it will force the points 16 of the hooks back through the cloth into the recesses 28 of the housing, in which position the transverse shoulders 32 of the buttons 13 and 14 will abut against the ends 27 of the housing 10, preventing tension in the cloth, as indicated by arrows, applied to the hooks from rotating the hooks open. Ridges 31 are formed transversely across the under side 21 of the housing 10 slightly inwardly of recesses 28 so that the ridges, recesses and points 16 will interact frictionally on the diaper fabric or other cloth to lock the cloth in clamped or hooked relationship against any tendency of the cloth to pull out of the safety clamp when tension is relaxed. The spring 15 can be made of several longitudinal elements instead of only one, as shown, or it can be made in the form of a ribbon or strip of resilient or spring material. Alternatively other resilient members may be used such as spiral compression springs, compressible, rubbery materials, etc. which can be sufficiently loaded to strongly urge the hooks into the tightly closed position described above.

The buttons 13 and 14 contain a portion 33 which converges outwardly somewhat and protrudes from the end of the housing 10. The portion 33 is provided with a blunt outer end which is rounded at its edges for convenient and comfortable manipulation by the operator's or manipulator's fingers. As shown in Fig. 1, the hooks 11 and 12 of the clamp normally are urged into the closed position and buttons 13 and 14 protrude maximum distances from the ends of the housing 10. The outward travel of the buttons caused by the loading of spring 15 is limited by engagement of the shank and yoke portions 18 and 19, respectively, of the hooks with the grooves 22 of the buttons and the enlarged apertures 20 through the inner side of the housing. The outward pressure of spring 15 also causes the buttons to pivot upwardly slightly and snap into position with stop shoulders 32 abutting against the outer ends 27 of the housing.

The safety clamp of my invention is readily manipulated between the thumb and fingers of the same hand by grasping the clamp with the thumb on one of the buttons 13 or 14, the index or middle finger on the other button and with the inner side 21 held outwardly from the hand. The buttons are pressed inwardly. This inward pressure, because of the bowed or angulated shape of housing 10, initially causes the buttons to pivot inwardly slightly from the position shown in Fig. 1 until the shoulders 32 slip under the ends 27 of the housing. Continued pressure on the buttons overcomes the outward pressure of spring 15 and causes the buttons to slide inwardly into the housing 10 until the open position shown in Fig. 2 is attained. Spring 15 is contracted or bowed as shown in Fig. 2 and in phantom in Fig. 3 and the hooks 11 and 12 are pivoted in clockwise and counterclockwise directions respectively, until the buttons are fully pressed into the housing of the clamp. At this stage the points 16 of the hooks point outwardly sufficiently so that they can be brought in contact with one or more laps of a diaper, dress or other cloth.

Upon releasing pressure on the buttons 13 and 14 the points 16 hook or capture cloth in adjacent laps. As the hooks 11 and 12 pivot toward the closed position, they gather the captured cloth as shown in Fig. 4, and pull the laps 29 and 30 toward the middle of the clamp. The cloth laps 29 and 30 are held under tension but this tension, indicated by arrows in Fig. 4, even if greatly increased, will not cause the hooks to open or loosen their grip on the cloth because the tension causes the buttons to pivot and lock even more securely with shoulders 32 thereof abutting tightly against housing edges 27. Thus the shoulders 32 prevent the buttons 13 and 14 from being drawn inwardly into the housing by strong outward tension in cloth laps 29 and 30, which otherwise might overcome the loading in spring 15 and loosen the clamp. In order to force buttons 13 and 14 inwardly in housing 10 a downward component of force is required on the buttons to cause the slight downward pivotal movement described above.

It will be seen, therefore, that cloth laps 29 and 30 are safely and securely held in clamped relationship against tension in the cloth either inwardly or outwardly of the clamp. Ridges 31 and recesses 28 assist in preventing dislodgment of the captured cloth from points 16 by tensions acting inwardly of the clamp, as described above in discussing the ridges and recesses. At the same time the hooks 11 and 12 are covered by cloth, such as that of a diaper, so that they will not come in contact with the baby's body. The safety clamp can be removed from the diaper, or other cloth, by simply pressing the buttons 13 and 14 into the ends of housing 10 by grasping them with the thumb and finger of the same hand, as described above, and disengaging the points 16 of the opened hooks 11 and 12 from the cloth.

Although I have shown and described a preferred embodiment of my safety clamp, I do not desire to be limited thereto, but desire to be afforded the full scope of the following claims.

I claim as my invention:

1. In a safety clamp, the combination of: a body having spaced ends; two actuators respectively carried by said body adjacent said ends thereof and respectively slidable relative to said body and toward each other from outer positions to inner positions; two hooks engaging said body and respectively engaging said actuators and respectively movable away from each other from closed positions to open positions in response to movement of said actuators from said outer positions to said inner positions; resilient means biasing said actuators and said hooks toward said outer positions and said closed positions, respectively; and interengageable stop means on said body and said actuators, respectively, for releasably locking said actuators and said hooks in said outer positions and said closed positions, respectively, against movement toward said inner positions and said open positions, respectively.

2. A safety clamp as set forth in claim 1 wherein said actuators are pivotable relative to said body for movement between positions wherein said stop means are in engagement and positions wherein said stop means are out of engagement.

3. A safety clamp as defined in claim 2 wherein said resilient means includes a spring engaging said actuators.

4. A safety clamp according to claim 3 wherein said body is bowed and wherein said hooks are located on the concave side of said body.

5. In a safety clamp, the combination of: a body; an actuator carried by said body and movable relative thereto between outer and inner positions; a hook engaging said actuator and said body and pivotable relative to said body between closed and open positions in response to movement of said actuator between said outer and inner positions, respectively; resilient means biasing said actuator and said hook toward said outer and closed positions, respectively; and interengageable stop means on said body and said actuator, respectively, for releasably locking said actuator and said hook in said outer position and said closed position, respectively, against movement toward said inner position and said open position, respectively.

References Cited in the file of this patent

UNITED STATES PATENTS

| | | |
|---|---|---|
| 1,315,369 | Klinge | Sept. 9, 1919 |
| 2,512,031 | Marcoux | June 20, 1950 |
| 2,642,796 | La Bore | June 23, 1953 |
| 2,667,676 | Sampson | Feb. 2, 1954 |

FOREIGN PATENTS

| | | |
|---|---|---|
| 24,349 | Great Britain | 1904 |
| 714,198 | France | 1931 |
| 737,498 | France | 1932 |